(12) United States Patent
Millett et al.

(10) Patent No.: US 10,814,774 B2
(45) Date of Patent: Oct. 27, 2020

(54) FREE-STANDING HOLDER DEVICE

(71) Applicant: STAYHOLD LIMITED, Dublin (IE)

(72) Inventors: Ben Millett, Boyle (IE); Alan Harrison, Ballina (IE); Michael Culleton, Swords (IE)

( * ) Notice: Subject to any disclaimer, the term of this patent is extended or adjusted under 35 U.S.C. 154(b) by 0 days.

(21) Appl. No.: 16/487,066

(22) PCT Filed: Feb. 19, 2018

(86) PCT No.: PCT/IB2018/051010
§ 371 (c)(1),
(2) Date: Aug. 19, 2019

(87) PCT Pub. No.: WO2018/150389
PCT Pub. Date: Aug. 23, 2018

(65) Prior Publication Data
US 2019/0381929 A1 Dec. 19, 2019

(30) Foreign Application Priority Data
Feb. 17, 2017 (GB) .................. 1702658.4

(51) Int. Cl.
*B60P 7/08* (2006.01)
*B60R 7/02* (2006.01)
*B60R 11/00* (2006.01)

(52) U.S. Cl.
CPC .............. *B60P 7/0892* (2013.01); *B60R 7/02* (2013.01); *B60R 2011/008* (2013.01); *B60R 2011/0036* (2013.01); *B60R 2011/0075* (2013.01)

(58) Field of Classification Search
CPC ... B60R 7/02; B60R 2011/0036; B60P 7/0892

USPC .......................................... D12/426; 224/542
See application file for complete search history.

(56) References Cited

U.S. PATENT DOCUMENTS

| 4,725,033 | A | * | 2/1988 | Zinnecker | B63B 25/28 |
| | | | | | 248/154 |
| 4,842,460 | A | * | 6/1989 | Schlesch | B60P 7/0892 |
| | | | | | 188/32 |
| 4,941,784 | A | * | 7/1990 | Flament | B60R 7/02 |
| | | | | | 211/184 |
| D326,077 | S | * | 5/1992 | Rana | D12/414 |
| 5,129,612 | A | * | 7/1992 | Beaupre | B60R 7/02 |
| | | | | | 224/539 |
| D375,038 | S | * | 10/1996 | Trevorrow | D8/354 |
| 5,865,580 | A | * | 2/1999 | Lawrence | B60P 7/0892 |
| | | | | | 410/117 |
| 6,109,847 | A | * | 8/2000 | Patel | B60R 7/02 |
| | | | | | 410/121 |
| D442,062 | S | * | 5/2001 | Kelley | D8/349 |

(Continued)

FOREIGN PATENT DOCUMENTS

| WO | WO-9603293 A1 | * | 2/1996 | ............... B60R 7/02 |
| WO | WO-2018155780 A1 | * | 8/2018 | ............... B60P 7/06 |

*Primary Examiner* — Justin M Larson
(74) *Attorney, Agent, or Firm* — Edwin Tarver

(57) ABSTRACT

A freestanding holder device to secure cargo items of different sizes or orientation in different types of cargo area comprises a horizontal base section and a wall section extending from one side of the base section, wherein the wall section comprises at least one vertical indentation forming a recess in the wall section and the underside of the base section comprises a high friction surface. The high friction surface comprises a rubber or elastomer material.

17 Claims, 12 Drawing Sheets

(56) References Cited

U.S. PATENT DOCUMENTS

| | | | | |
|---|---|---|---|---|
| D458,210 S | * | 6/2002 | Kanczuzewski | B60P 7/15 D12/426 |
| 6,702,532 B1 | * | 3/2004 | Throener | B60P 7/0892 410/121 |
| 7,306,416 B1 | * | 12/2007 | Arico | B60P 7/0892 410/102 |
| D611,317 S | * | 3/2010 | McGrath | D12/223 |
| D689,359 S | * | 9/2013 | Fisher | D8/499 |
| 9,011,056 B2 | * | 4/2015 | Malmstrom | B60P 7/0892 410/121 |
| 9,067,521 B1 | * | 6/2015 | Masanek, Jr. | B60R 11/00 |
| D738,809 S | * | 9/2015 | Thom | D12/426 |
| 9,248,783 B2 | * | 2/2016 | Thom | B60R 7/02 |
| D756,291 S | * | 5/2016 | Masanek, Jr. | D12/426 |
| D772,142 S | * | 11/2016 | Masanek, Jr. | B60R 11/00 D12/425 |
| 9,868,383 B2 | * | 1/2018 | Preston | B60P 7/135 |
| 9,931,988 B2 | * | 4/2018 | Culleton | B60R 5/04 |
| 9,956,918 B2 | * | 5/2018 | Thom | B60R 7/02 |
| 10,160,374 B2 | * | 12/2018 | Salazar Loera | B60P 7/14 |
| D855,553 S | * | 8/2019 | Chiang | D12/426 |
| D864,514 S | * | 10/2019 | Preston | B60P 7/0884 D34/38 |
| 10,518,714 B2 | * | 12/2019 | Masanek, Jr. | B65D 11/22 |
| D872,679 S | * | 1/2020 | MacAvoy | D12/223 |
| 2009/0080993 A1 | * | 3/2009 | Burgess | B65D 90/006 410/94 |
| 2016/0121803 A1 | * | 5/2016 | Masanek, Jr. | B60R 11/00 220/4.28 |
| 2019/0232859 A1 | * | 8/2019 | Stanesic | B60P 7/0892 |
| 2019/0381929 A1 | * | 12/2019 | Millett | B60P 7/0892 |
| 2020/0108778 A1 | * | 4/2020 | Mamo | B60R 7/08 |

* cited by examiner

FREE-STANDING HOLDER DEVICE

RELATED APPLICATIONS

This application claims priority to Patent Cooperation Treaty application no. PCT/IB2018/051010, entitled "A Free-Standing Holder Device," which was filed on Feb. 19, 2018, and designated international publication number WO 2018/150389.

BACKGROUND

The invention relates to a free-standing holder device for securing item(s) within a cargo area in a vehicle.

Items held loosely in the cargo area of a vehicle often prove problematic when in transit. Loose items may cause damage or become damaged by moving freely whilst the vehicle is in motion. These items may include, but are not limited to, items that are prone to being damaged, causing damage or creating a mess in the cargo area. Items such as heavy items, breakable or fragile items, items of awkward shape, items that may spill their contents. For example potted plants, laptops, wheelchairs, push-chairs, coolboxes, sports equipment or items (e.g. football, rugby ball, scooters, skateboards etc.), items of shopping (e.g. bottles, tins, foodstuffs, etc.) or luggage. In cargo areas of lorries or trucks loose items can be very problematic to fasten securely.

Items if left loose in a cargo area may become damaged or cause damage to other items during transit. Having an organized cargo space is a safety issue. The movement of such items within the cargo area may cause annoyance or anxiety to the driver or passengers of the vehicle. Loose cargo that moves about while driving can distract the driver and cause the driver to alter their driving style or take their attention off the road while trying to see or hear what is moving. In addition with a messy/cluttered cargo space a driver may be inclined to carry cargo in the cockpit of the vehicle which could be dangerous to the driver or passenger if the cargo moves during transit. Secure cargo is safer for driving.

There is a need for an improved means to contain items securely within a cargo area of a vehicle.

SUMMARY

According to the invention there is provided a freestanding holder device comprising:
 a horizontal base section; and
 a wall section extending from one side of the base section;
wherein the wall section comprises at least one vertical indentation forming a recess in the wall section and the underside of the base section comprises a high friction surface.

In one embodiment of the invention the high friction surface comprises a rubber or elastomer material.

In one embodiment of the invention the device comprises a tapered inline rib extending at a right angle to the wall section at either end of the vertical wall section.

In one embodiment of the invention the wall section extends vertically at a right angle from one side edge of the base section. Preferably the lower outer face of the wall section comprises a sloped base section.

In one embodiment of the invention the device comprises a central vertical indentation in the wall section extending outwardly from the base section and forming a recess on the inner face of the wall section. Preferably the indentation comprises a substantially triangular shape.

In one embodiment of the invention the device comprises elongated ribs extending vertically along the inner face of the wall section.

In another embodiment of the invention the upper surface of the base section comprises an anti-slip rubber patterned surface.

In one embodiment of the invention the device comprises at least two handles or grip holes on the upper end of the wall section.

In one embodiment of the invention the device comprises at least two elongate receiving openings.

In one embodiment of the invention the device comprises at least two elongate receiving openings in the wall section and at least two elongate receiving openings in the base section.

In one embodiment of the invention the device comprises at least one receiving opening in the tapered inline rib.

In one embodiment of the invention the device comprises at least one detachable panel section. Preferably the panel section is rigid with hinged sections. Most preferably the panel section is telescopic.

In one embodiment of the invention the panel section is detachably connected to an elongate receiving opening in the wall section using self-engaging non-return connectors.

Another embodiment of the invention comprises two panel sections for connecting one holder device to another holder device to form an enclosed space. Preferably the panel sections are connected perpendicular to the vertical wall sections of the two holder devices. Alternatively the panel sections may be connected diagonally between the vertical wall sections of the two holder devices.

In one embodiment of the invention the wall section extends initially at an angle of less than 90° from the side edge of the base section forming a sloped section before extending vertically and substantially perpendicular to the base section. Preferably the sloped section comprises vertical indentations extending inwardly on the base section and forming a recess on the outer face of the wall section.

In one embodiment of the invention the device is stackable.

In one embodiment of the invention the upper surface of the base section is inclined downwardly from the wall section and surface comprises hollow patterned surface.

In one embodiment of the invention the device comprises a durable plastics material or lightweight metal material.

According to the invention there is provided use of the holder device for securing cargo in a cargo area of a vehicle.

BRIEF DESCRIPTION OF THE FIGURES

The invention will be more clearly understood from the following description thereof with reference to the accompanying drawings in which.

DESCRIPTION

Figure 1:
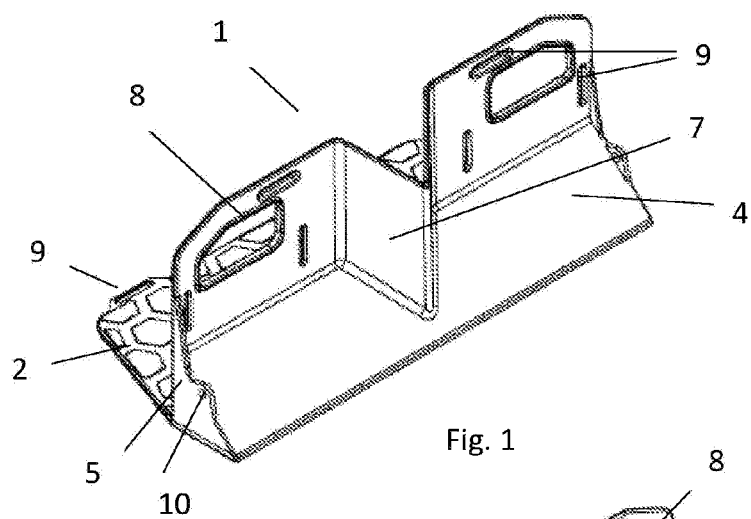
FIG. 1 is a perspective view from the rear of a holder device according to the invention.
Figure 2:
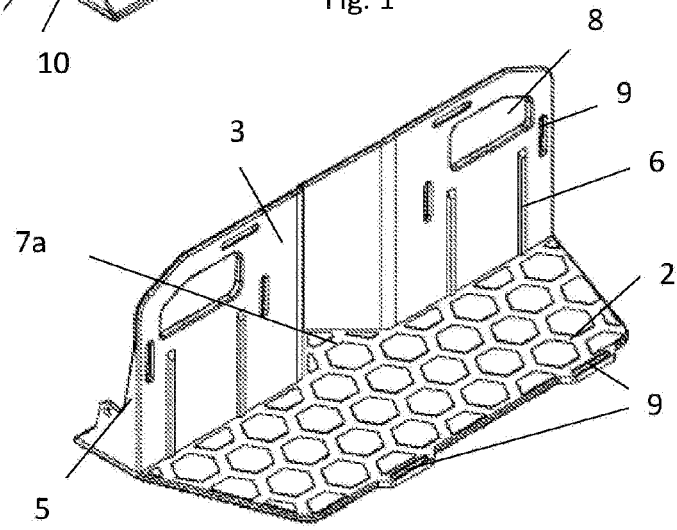
FIG. 2 is a perspective view from the rear of the device of FIG. 1.
Figure 3:
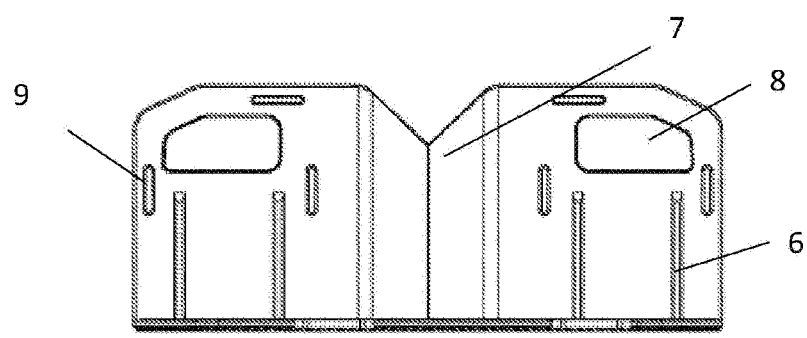
FIG. 3 is a view from the front of the device of FIG. 1.
Figure 4:
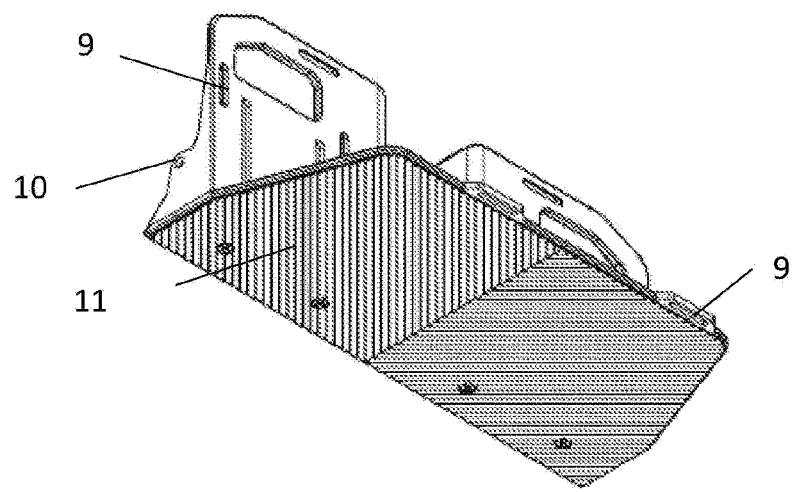
FIG. 4 is a perspective view of the device of FIG. 1 showing the underside of the base section of the device.
Figure 5:
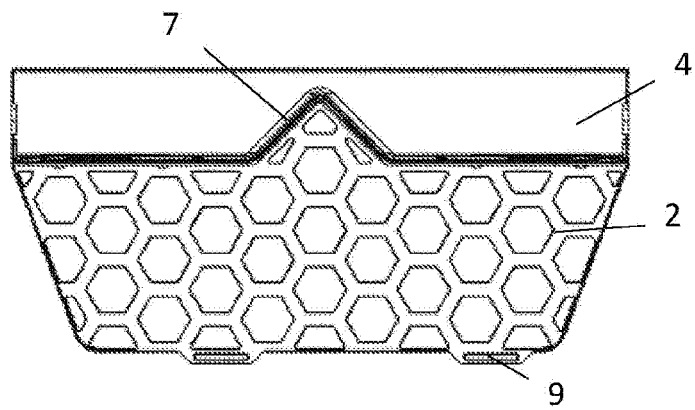
FIG. 5 is a view from the top of the device of FIG. 1.
Figure 6:
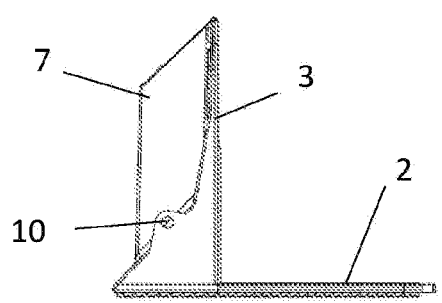
FIG. 6 is a side view of the device of FIG. 1.

An example of a free-standing holder device is described in our prior patent application PCT/IB2014/059113. The free-standing holder unit of PCT/IB2014/059113 has a vertical wall section and bottom wall forming an overall L-shaped cross section reinforced by molded ribs. The freestanding wall unit is secured to the carpeted floor of a vehicle's cargo area by means of continuous strips of VELCRO® Brand hook material.

The present invention provides an improved free-standing holder device. The freestanding holder device of the present invention is very robust and allows the user to secure cargo items of different sizes or orientation in any type of cargo area including commercial vehicle cargo areas. The device of the present invention provides more modular positioning options and improved flexibility of use. People are more likely to secure their goods in a cargo area if the method used to secure them is easy, quick to use and effective.

The underside or undersurface of the device of the present invention has a textured surface. The surface flexes and deforms under compression from the cargo's weight on the horizontal base section of the device conforming to the shape of the ground surface and maximizing the surf ace area in contact with the ground to provide maximum chance of grip. The device may be used on a variety of surfaces including but not limited to carpets, rubber/plastic boot liners, wooden paneling commonly used in light commercial vehicles and/or corrugated or non-corrugated metal surfaces in beds of pickup trucks or other commercial vehicles.

As shown in the drawings the freestanding holder device 1 of the present invention has a substantially L-shaped cross section comprising a horizontal base section 2 and a wall section 3 extending from one side of the base section 2. The vertical wall section 3 extends at a right angle from the base section 2. The lower outer face of the wall section 3 comprises a sloped lower section 4.

The horizontal base section 2 provides a cargo platform on which items/cargo may be placed. The device 1 has ribs 6 on the inner face of the vertical wall 3 to secure items in place along the base section or cargo platform 2. The vertical wall section 3 and horizontal base section 2 have inline molded tapered ribs 5, one positioned at either end of the device 1. The ribs 5 extend at right angles from the edge of the vertical wall section 3 and the horizontal base section 2. The tapered ribs 5 add strength and support to the wall section 3.

The sloped lower section 4 of the wall section 3 has two mam functions, it accommodates the ribs 6, and acts itself as an elongated rib which provides support to the vertical wall section 3. The angled surf ace of the sloped lower section 4 also ensures that the user positions cargo on the horizontal base section or cargo platform 2 instead of attempting to place cargo on the opposite side of the wall section. The design of the unit leads to intuitive use by the user and also leads to unconscious correct use of the device. By placing cargo on the cargo platform 2 the weight of said cargo contributes to the overall steadfastness of the device 1.

Figure 7:
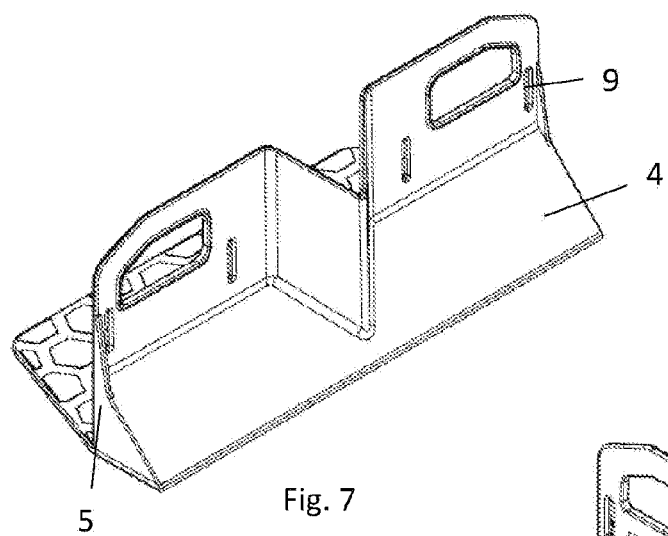
FIG. 7 is a perspective view of a holder device according to another embodiment of the invention.
Figure 8:
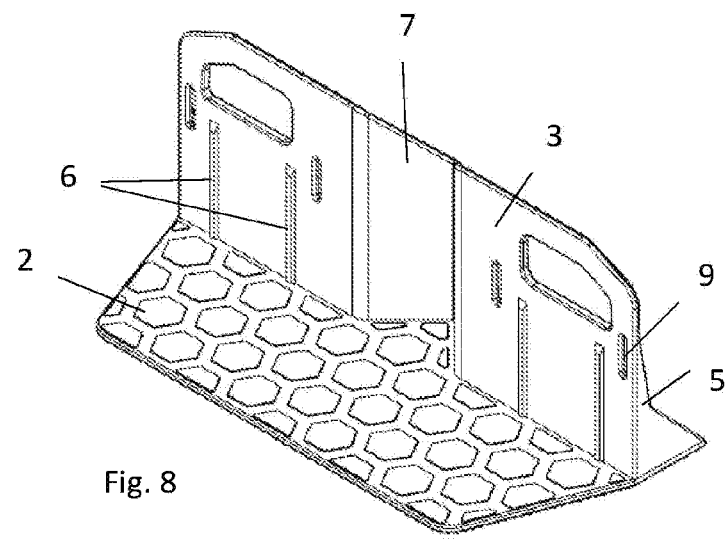
FIG. 8 is a perspective view from the front of the device of FIG. 7.
Figure 9:
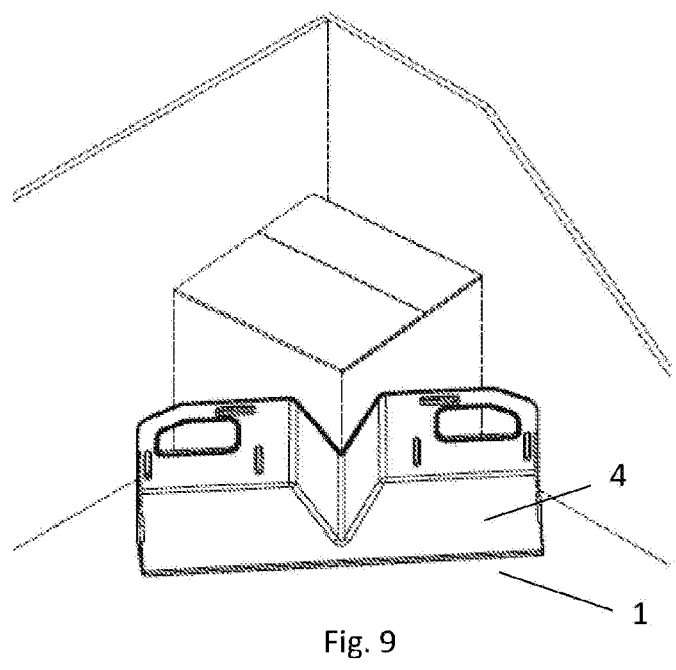
FIG. 9 is a perspective of the device of FIG. 7 in use in a vehicle cargo area.

The vertical wall section 3 comprises at least two elongate receiving openings or slots 9 through which holding straps may be passed to secure items in position against the wall section 3. Some of the elongate openings or slots 9 are located vertically along the wall section and some horizontally along the upper edge of the wall section 3. Others may be located along the edge of the base section 2. The elongate openings or slots 9 allow attachment straps to be wrapped around or over cargo positioned on the cargo platform or base section 2 of the device 1. In this way cargo is secured on the base section 2 in the event of the vehicle hitting a pot-hole in the road or encountering rough terrain and the device 1 bounces vertically. This kind of vertical securing may also be obtained by using a cargo net fastened onto several of the slots 9. The positioning and number of elongate slots 9 provides extra strapping configurations. FIGS. 7 to 9 show the device 1 with fewer slots 9.

The outer face of the wall section 3 just above the sloped lower section 4 and below the handles 4 may have adhesive panels of loop fabric. Elastic attachment straps with VEL-CRO® Brand Hook panels on the ends for example may be stuck onto the adhesive panels of loop fabric and fed through one or multiple of the slots 9 and looped through another slot 9 and the end stuck onto the adhesive panel. The straps may also be wrapped over the device.

The adhesive panel of loop fabric allows a shorter attachment strap to be used instead of having to wrap a strap all the way around the device 1. The adhesive panels of loop fabric also allow for easy adjustment and modular use whereby straps can be joined or looped through any combination of slots 9. The adhesive panel of loop fabric is attached perpendicular to the direction the strap goes through slot 9. The combination tensile force applied to the strap when in use is transferred onto the VELCRO® Brand hook panel on the adhesive loop panel as a shearing force, which is the direction in which Velcro® hook material provides the best grip.

The device 1 also has circular openings or eyelets 10 along the side edge of the tapered inline ribs 5. Tethers may be attached to the openings or eyelets 10 to secure the device 1 to the vehicle cargo bed or wall. This provides extra protection and security to cargo.

The device 1 has a central 'V' shaped indentation 7 in the vertical wall section 3. The indentation extends outwardly from the base section 2 and forms a recess 7a on the inner face of the wall section 3. Depending on the use and/or the size and length the device may have multiple similar indentations. The device 1 may have indentations of different shape, for example they may be wider and more rectangular in shape. The indentations provide support to the vertical wall section 3. In addition the indentations accommodate larger objects such as cylindrical paint tins or containers or such like, and provide traction to more irregular objects such as grocery bags.

Additional indentations improve the ability of the holder device 1 to hold and secure items such as bottles, paint tins, boxes, and other large items with corners or radii which sit on the base section or cargo platform 2 and into the indentations. The 'V' shaped indentation is able to accommodate the corners of cargo and various shapes of cargo.

The indentation 7 may also be used in conjunction with cargo straps and elongated slots 9 provided in the vertical wall section 3 as hereinbefore described. The indentation also intends to communicate to the user the ideal place to place cargo. By providing the indentation as an obvious space to place cargo it is assured that the cargo will be centered on the unit's cargo platform thus providing the most even distribution of the cargo's weight over the unit and providing the maximum chance of grip as opposed to if the cargo was placed near the edge of the cargo platform 2.

The vertical wall section 3 has at least two handles or grip holes 8 for holding and gripping the unit by hand. The handles or grip holes 8 allow the device 1 to be easily carried and positioned. The handles positioned proximal to either end of the unit to reduce the reach requirement of the user when positioning the device and accommodating dual handed use or ambidextrous use.

Cargo areas rarely have regular shaped sides and the overall shape of the holder device 1 of the present invention helps the unit to be positioned more effectively in awkward or corner spaces.

The open horizontal planar base section 2 of the device 1 of the present invention allows the user to use the device 1 to secure cargo items of different size or orientation. The items may be placed on the cargo platform or base section 2 and secured in position using straps passed through the elongate vertical openings or slots 9.

The underside or undersurface 11 of the horizontal base section 2 has a textured surface which allows device 1 to be used on a variety of surfaces including but not limited to carpets, rubber/plastic boot liners, wooden paneling commonly used in light commercial vehicles and/or corrugated or non-corrugated metal surfaces in beds of pickup trucks or other commercial vehicles.

The underside 11 of the cargo platform or horizontal base section 2 comprises a high friction underside surface made from any suitable material such as rubber or elastomer. The surface flexes and deforms under compression from the cargo's weight on the horizontal base section 2 conforming to the shape of the ground surface and maximizing the surface area in contact with the ground to provide maximum chance of grip. This is particularly useful on ground surfaces with irregular surface shape for example corrugated surfaces, cargo areas with debris covering the ground and rubber/plastic trunk liners which may feature textured patterns or indentations.

The material used on the underside or undersurface of the device 1 may be of varying types to meet the requirements of the particular working environment and specifically accommodate different ground surfaces. The material used on the underside of the device may be varied in density and depth depending on the working surface and environment.

The under-surface 11 of the horizontal base section 2 may comprise a plurality of "fingers" spaced to fill the area of the surface and extending vertically downwards from the under-surface 11 of the horizontal base section 2. The fingers flex and deform against the ground surface when cargo is placed on the cargo platform 2 allowing the fingers to conform to the shape of the ground surface and maximize the surface area in contact with the ground thereby providing the device 1 a maximum chance of grip.

Alternatively the under-surface 11 of the horizontal base section 2 may comprise a plurality of essentially inflexible solid plastic teeth or hard nibs which dig into and grip the ground surface.

Another variation may feature a rubber surface of asymmetrical 'zig-zag' cross section that provides grip on the ground surface whereby the direction of the 'zig-zag' opposes the direction that the device will be pushed or want to move as a result of forces exerted during transit. Another variation of the under-surface 11 may be flat or lightly textured rubber or high friction material. Such a low profile under-surface would be useful on smooth ground surfaces such as flat metal truck beds or smooth plastic trunk/boot liners where maximum surface area contact will result in the best anti-slip performance. Another variation would be the use of multiple suction cup material.

The weight of the cargo presses the high friction under-surface 11 into the ground floor thereby increasing grip via heightened friction. By compression the device is secured on the floor surface.

The upper surface of the horizontal base section or cargo platform 2 comprises an antislip rubber patterned surface providing increased protection against loose items placed on the platform from moving laterally.

The material used in the manufacture of the device 1 is heavy enough to provide sufficient grip when a light object is being secured on the cargo platform 2. When a heavier item is being secured on the cargo platform 2 the items own weight increases the grip the device 1 has on the ground thereby increasing the support the device 1 provides to the cargo. The heavier the cargo or item being positioned on the cargo platform 2 the more grip is provided. If cargo on the platform 2 moves during transit and presses against the wall section 3 the sloped base section or ledge prevents the device 1 from beginning to tip and causes the weight of the cargo to remain on the platform 2 thus maintaining grip.

Figure 10:
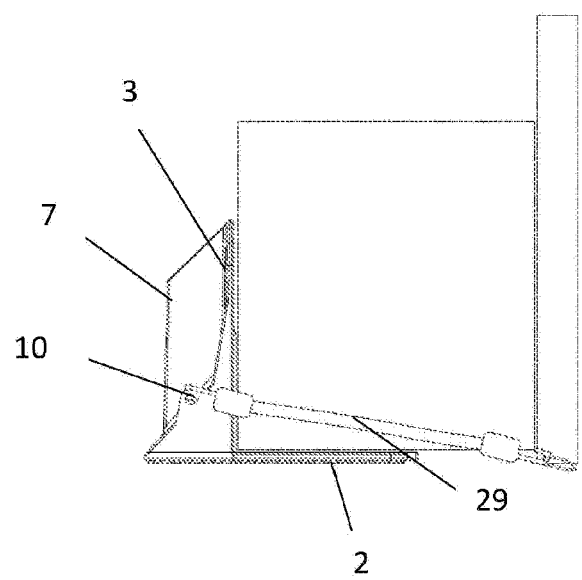
FIG. 10 is a side view of the device of FIG. 1 tied down in a cargo area and holding an item in position.

The cargo platform or horizontal planar base section 2 of the device 1 may be tucked underneath objects (such as large boxes etc.) thus leveraging the weight of the object itself to create extra grip (FIGS. 9, 10). To leverage the functionality of the device 1 it is essential to place cargo on the horizontal planar base section 2.

The device 1 is a heavy duty unit and may be used in utility vehicles or commercial purpose vehicles. It can withstand more incessant and rugged use. The nature of commercial use and commercial vehicles also demands added functionality for transporting and securing a great variety of goods.

Sometimes it may be useful to tether the device 1 to provide extra support and permanency to the device in the position it is placed (FIG. 10). This may be useful in the back of a utility vehicle where rough terrain may cause the vehicle to sway or bump and cause the device 1 to become dislodged or move from its' set position. In this instance the use of adjustable straps, elasticated ties or rope lengths to tether the device 1 to tie down points located on the vehicle bed or wall will assure the device does not move and providing increased protection to the contained cargo. Tie downs may be fastened to the elongate openings or slots 9, or in the case of a hooked tie 29 down the circular openings or eyelets 10.

Tethering the device 1 to the bed or wall of a vehicle has another advantage when securing cargo. Said cargo may be of a fragile nature whereby the use of a strap alone to secure the cargo may cause damage to the cargo when tightened. This could happen by the tension of the strap being concentrated only on the surface area of the strap in contact with the cargo. In this instance the use of the device 1 with the strap fed through it whereby the cargo is being held on the base section 2 of the unit 1 and the strap is tethering the unit 1 to the tie down points in the cargo area. In this case the tension of the strap is applied to the device 1 and the pressure from the tension is spread more evenly on the cargo by the larger surface area of the unit 1 in contact with the cargo. This will reduce the risk of crushing or damage being caused to the cargo.

Figure 11:
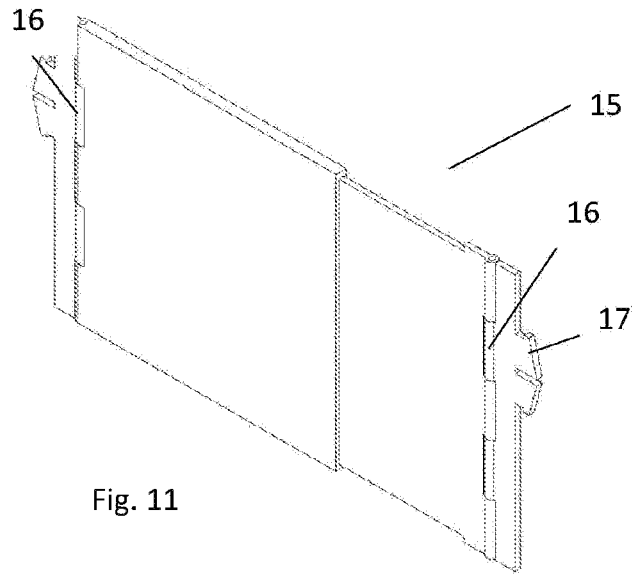
FIG. 11 is a perspective view of a panel section of the invention.
Figure 12:
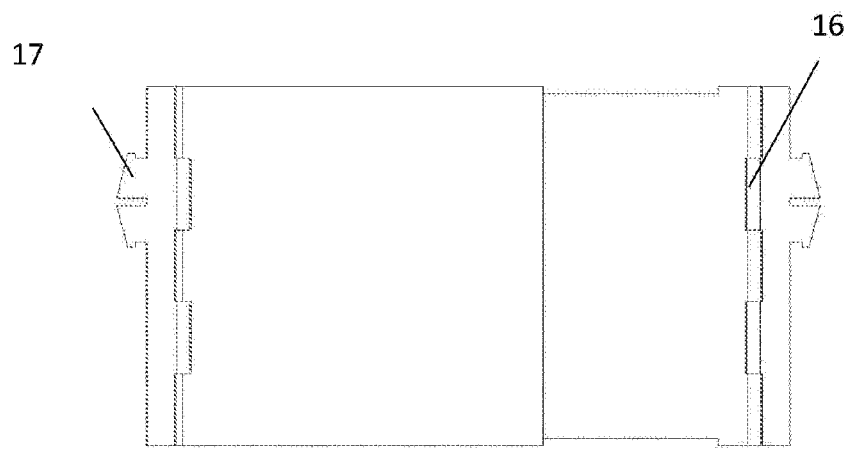
FIG. 12 is a front view of the panel section of FIG. 11.
Figure 13:
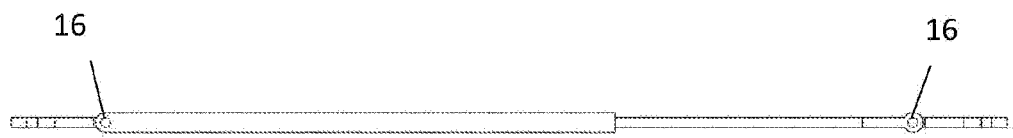
FIG. 13 is a downward view of the panel section of FIG. 11.

In another embodiment of the invention the device 1 comprises detachable panel section 15 as shown in FIGS. 11 to 13. The panel section 15 may be connected to the vertical wall section 3 to provide additional support to cargo. The panel section 15 may be connected to the vertical wall section 3 on two devices 1 such that an enclosed and secure cargo area is formed between the two devices as shown in FIGS. 13 to 20.

The panel section 15 is rigid and may comprise hinged sections 16 so that different configurations may be provided. The rigid panel section may also be telescopic to accommodate larger objects.

The panel sections are detachably connected to the vertical wall section 3 of the device 1 by means of the elongated openings or slots 9, using self-engaging non return connectors 17 or any other suitable means. The panel section 15 may be used with any of the elongated openings or slots 9 allowing a variety of different sized enclosed sections to be created.

Figure 14:
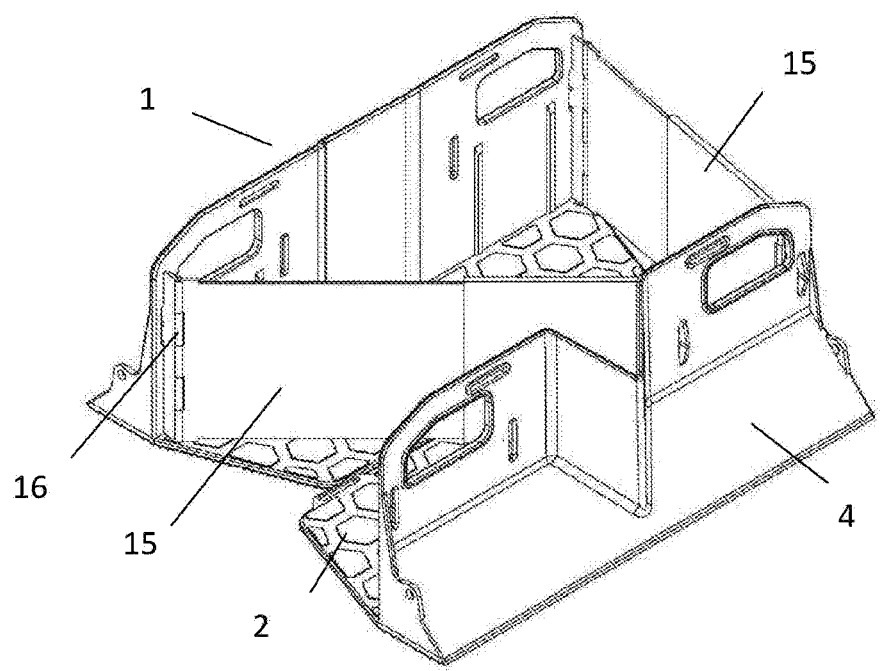
FIG. 14 is a perspective view from the top of two devices of the invention connected by means of panel sections.
Figure 15:
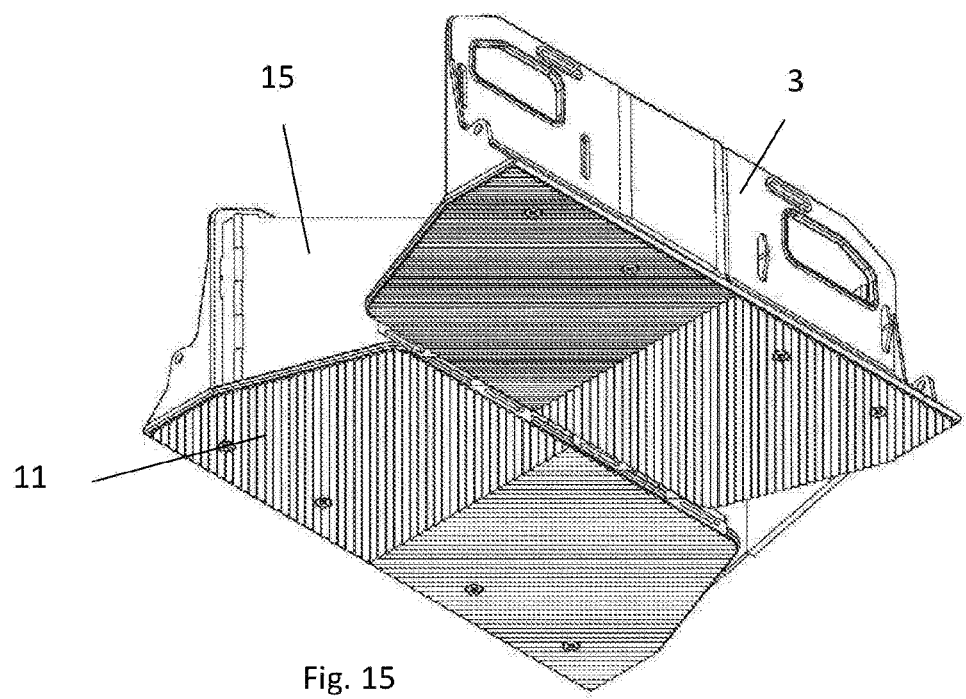
FIG. 15 is a perspective view from the bottom of two devices of the invention connected by means of panel sections.
Figure 16:
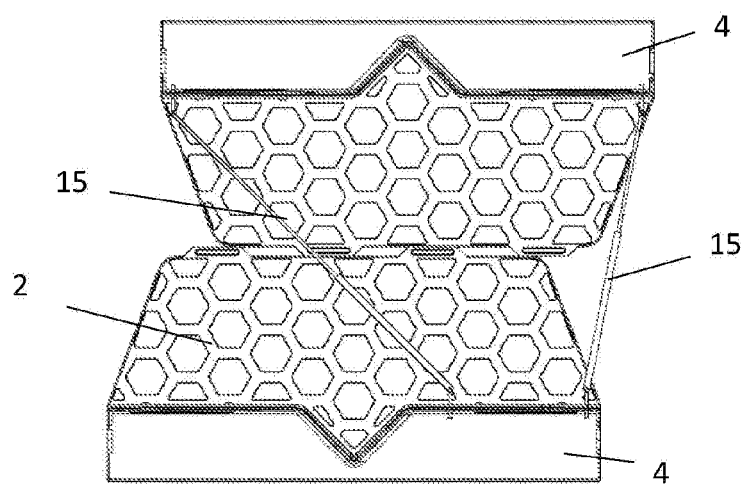
FIG. 16 is a downward view of two devices of the invention connected by means of panel sections.
Figure 17:
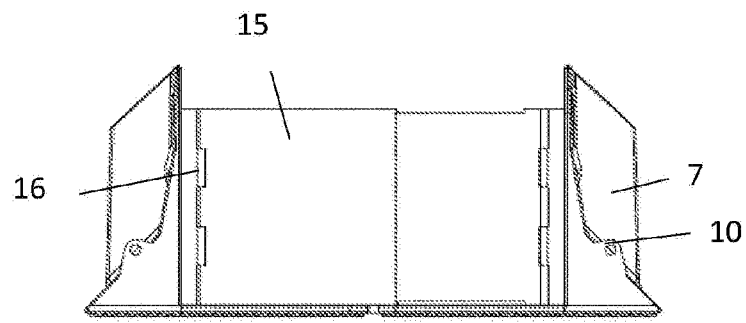
FIG. 17 is a side view of the two devices in FIG. 16.
Figure 18:
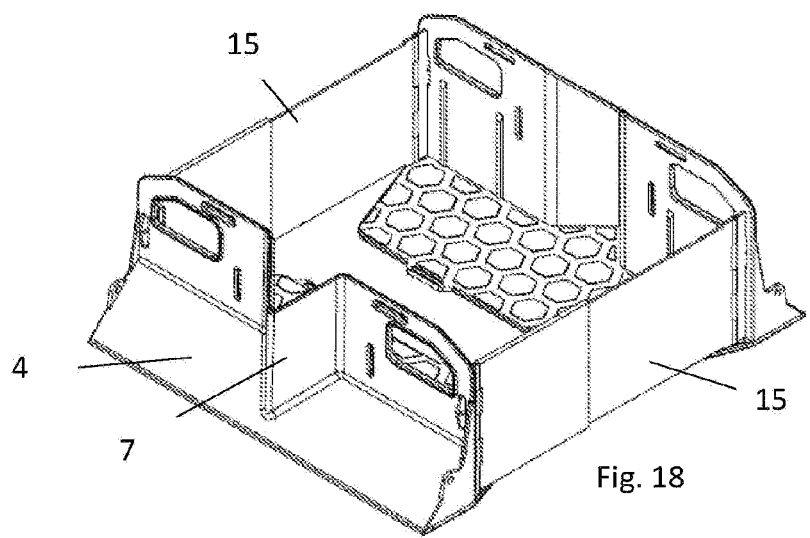
FIG. 18 is a perspective view from the top of two devices of the invention connected in a different configuration by means of panel sections.
Figure 19:
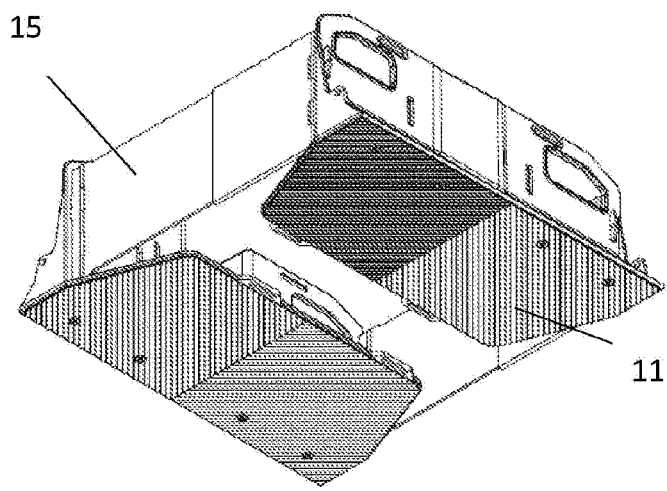
FIG. 19 is a perspective view from the bottom of two devices connected as in FIG. 18.
Figure 20:
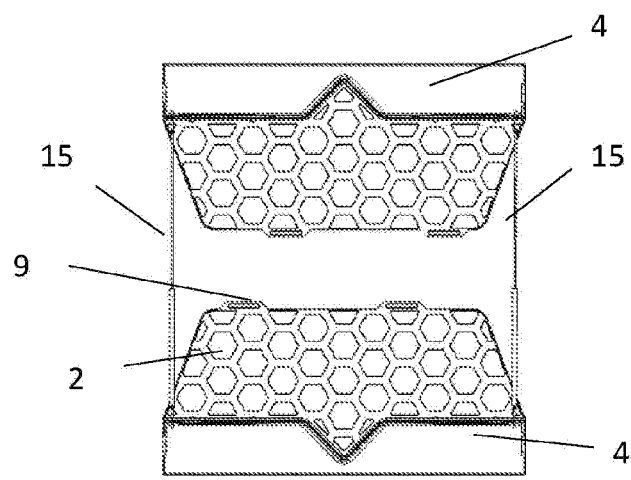
FIG. 20 is a downward view of the two devices of FIG. 18.
Figure 21:
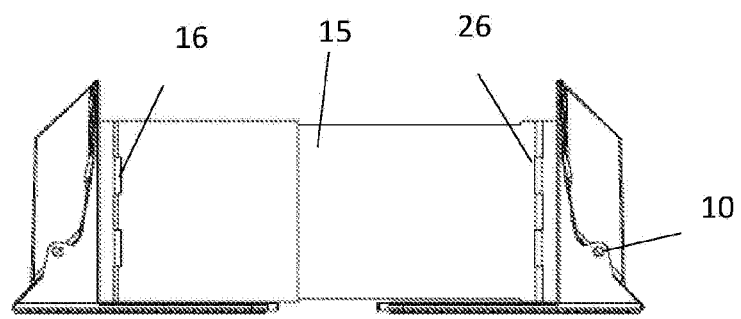
FIG. 21 is a side view of the two devices of FIG. 18.
Figure 22:
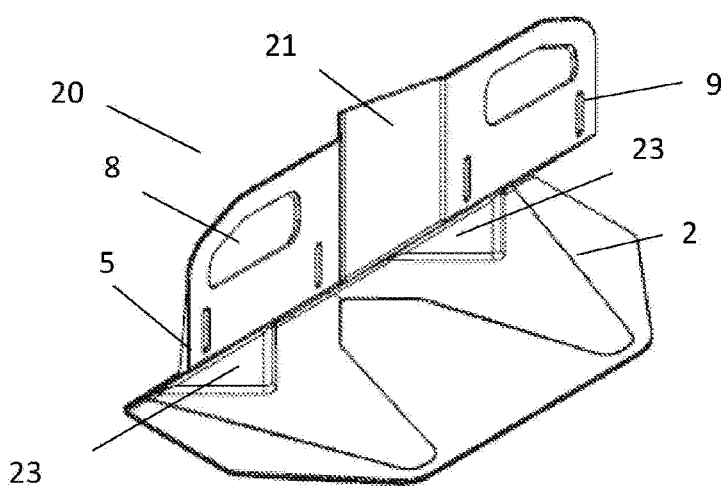
FIG. 22 is a front perspective view of a holder device according to another embodiment of the invention.
Figure 23:
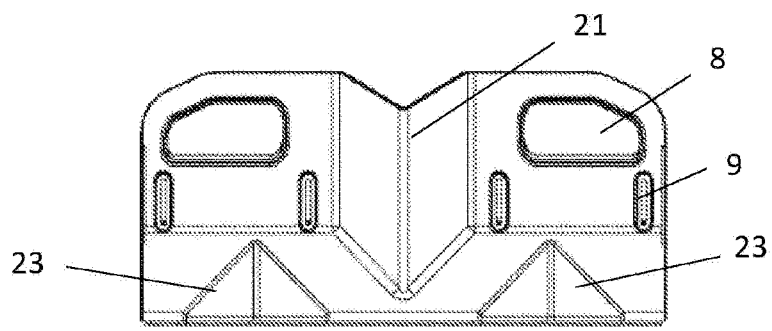
FIG. 23 is a view from the rear of the device of FIG. 22.
Figure 24:
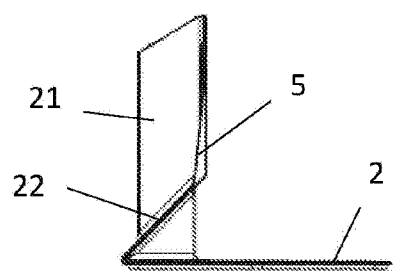
FIG. 24 is a side view of the device of FIG. 22.
Figure 25:
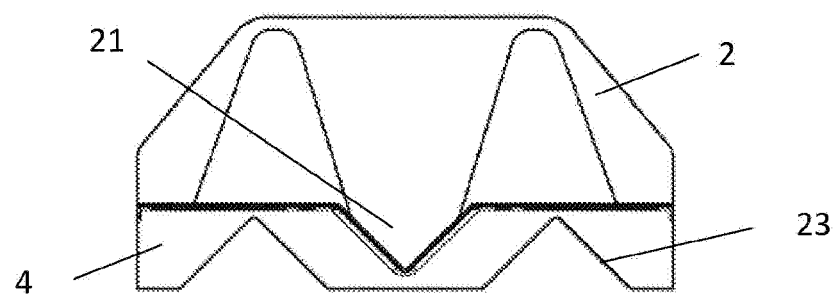
FIG. 25 is a downward view of the device of FIG. 22.
Figure 26:
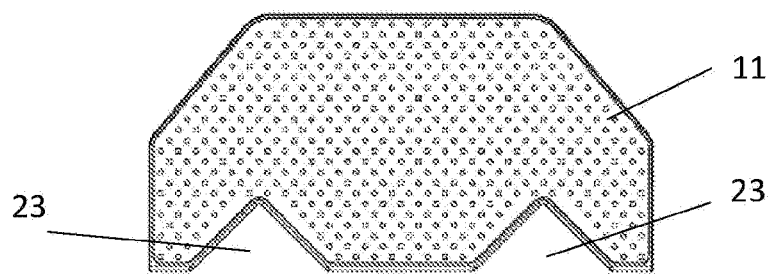
FIG. 26 is a view from the underside of the device of FIG. 22.
Figure 27:
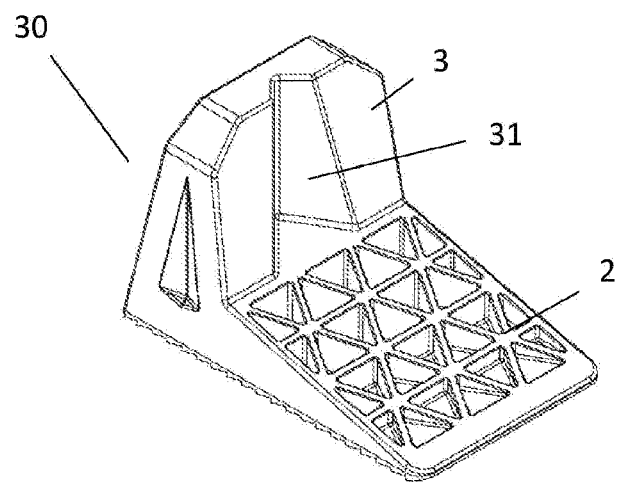
FIG. 27 is a front perspective view of a holder device according to another embodiment of the invention.
Figure 28:
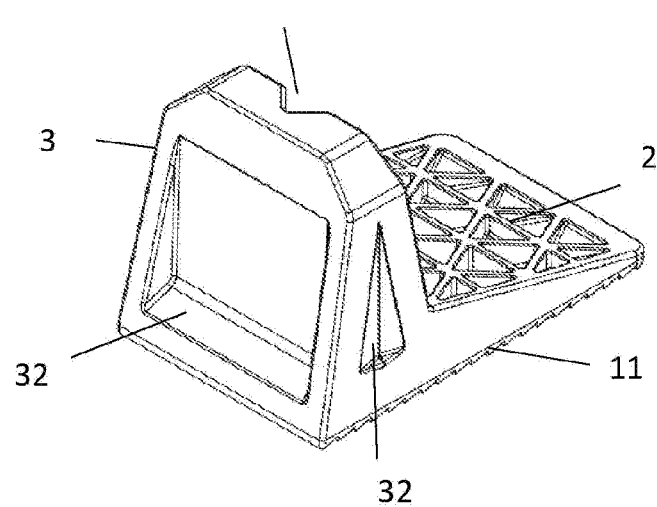
FIG. 28 is a rear perspective view of the holder device of FIG. 27.
Figure 29:
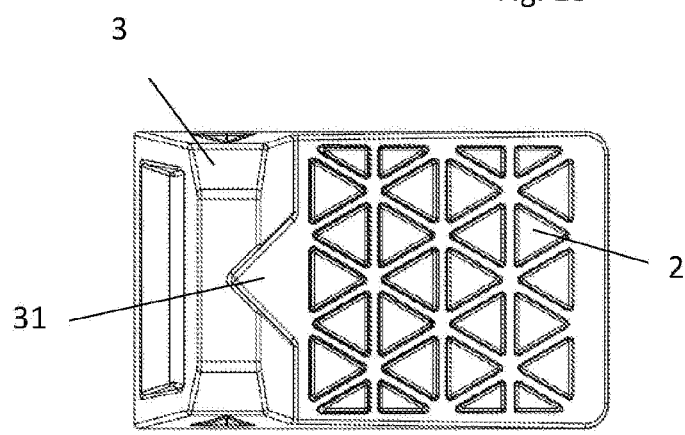
FIG. 29 is a downward view of the device of FIG. 27.
Figure 30:
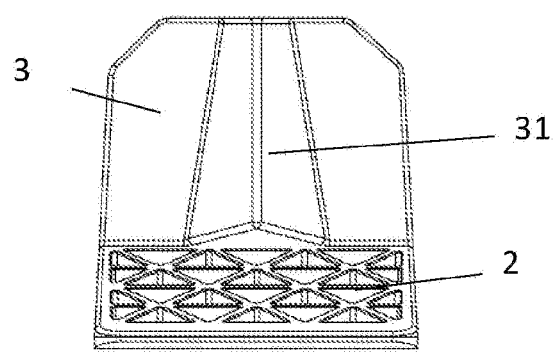
FIG. 30 is a view from the front of the device of FIG. 27.
Figure 31:
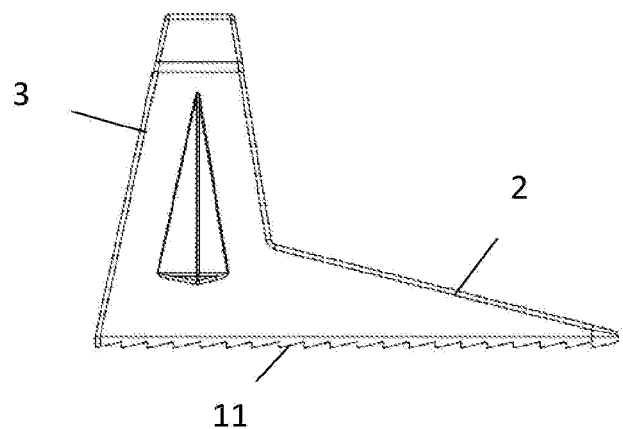
FIG. 31 is a side view of the device of FIG. 27.

The panel section may be attached diagonally between the wall sections 3 of two devices (FIG. 14). The panel section may be attached substantially perpendicular to the vertical wall sections (FIG. 17). In this configuration there may be a gap between the longitudinal side edge of the base section of the two devices or the devices may interlock depending on whether the panel section are in an extended position or not. In this way a variety of different configurations of confined areas of cargo space may be created.

Sometimes it is necessary to fully enclose a loose object which is being transported in a vehicle to protect it. When straps are not suitable to restrain the object the rigid divider panels may be useful to enclose or divide the space in between two devices 1.

The panel section 15 may also be used with the horizontal slots 9 at the top of the wall section 3 to provide a ceiling for the cargo positioned on the cargo platform or base section 2. This may be useful in the case of bumpy terrain where it may be a problem that cargo bounces up and down while in transit. The ceiling provided by the panel section prevents cargo from becoming dislodged from the cargo platform.

Referring now to FIGS. 22 to 26, there is illustrated a holder device according to another embodiment of the invention, which is indicated generally by the reference numeral 20. The holder device 20 is substantially similar to the device 1 and similar components are identified by the same reference numerals.

In this embodiment of the invention the wall section 3 extends from the planar base section 2 initially at an angle (of less than 90°) forming a sloped section 22 before extending vertically substantially perpendicular to the base section 2. The device 20 has a central V shaped indentation 21 in the upper vertical section of the wall section 3. The device 20 also has additional triangular or pyramidal indentations 23 in the sloped section 22 of the wall section 3. The indentations 23 provide support to the wall section 3 and allow multiples of the unit to be more easily stacked. The additional indentations 23 also perform a secondary role of natural flexing/dampening of the unit if for instance the device 20 is hit hard against the wall section 3. The indentations 23 also provide functionality to secure the corner or edges of cargo. The holder device 20 is very lightweight. To save space the device 1 may be stacked for storage when not in use. The device is also very space efficient for shipping and logistics purposes saving costs when shipping in bulk.

The sloped section 22 and triangular or pyramidal indentations 23 are fundamentally designed to accommodate the units stacking in multiple whilst also providing adequate support to the vertical wall for cargo retention. The triangular or pyramidal indentations 23 must be of an internal angle greater than or equal to 90 degrees to enable efficient stacking. The angle of the sloped section 22 relative to the horizontal planar base section 2 is also important to the stacking feature being possible. The indentation 21 also accommodates the stacking feature. The device may be stacked without requiring a modification of form which would compromise performance.

The under-surface 11 of the cargo platform or horizontal base section 2 of device 20 comprises a high friction underside surface made from any suitable material such as rubber or elastomer as hereinbefore described for device 1.

Referring now to FIGS. 27 to 31 there is illustrated a holder device 30 according to another embodiment of the invention, which is indicated generally by the reference numeral 30. The device 30 is essentially wedge-shaped with an upright wall section 3 which provides support to rigid cargo under which the unit 30 is placed.

In this embodiment of the invention the cargo platform or base section 2 is inclined slightly to allow the device 30 to be more easily wedged under a cargo item. The surface 11 of the inclined cargo platform 2 has an anti-slip rubber patterned surface forming a hollow patterned surface. The surface allows the base section 2 to deform slightly when cargo is placed onto it. The deformation decreases the chances of the device 30 from slipping out from under the cargo. The wall section 3 has tapered inner and outer sides which provide stability and prevents the unit from tipping. The wall section 3 has a central 'V' shaped indentation 31 and a number of other indentations 32.

The device 30 is a small unit which may be used to secure an item without taking up too much room or it may be used in small and awkward corners.

The under-surface 11 of the cargo platform or base section 2 of device 30 comprises a high friction underside surface as hereinbefore described for device 1 and 20.

The surface flexes and deforms under compression from the weight of the cargo on the cargo platform 2 conforming to the shape of the ground surface and maximizing the surface area in contact with the ground to provide maximum chance of grip.

The device 30 may be manufactured from a rubber or synthetic elastomer material.

The device 30 is intended to be used with larger more regular shaped objects such as boxes, suitcases, cooler-boxes, furniture (couches, cabinets) or such like. For this reason the device 30 does not require such a high vertical retaining wall section as with devices 1 and 20. However, the same principle of using the cargo's own mass/weight to increase friction and grip is utilized. The rigid nature of the cargo and the low or even center of gravity of the cargo for which the device 30 is designed to be used with means that the retaining force device 30 applies to the cargo to prevent it from moving while in transit can be applied at the base of the cargo.

The freestanding holder devices 1, 20 and 30 of the present invention enable items and articles of differing sizes and shapes to be held securely within the cargo area of a vehicle. The unique shape of devices 1, 20 and 30 allows for more modular positioning options and flexibility of use. The indentations in the wall sections gives additional support and strength making the devices very robust and sturdy. The devices of the present invention allow for efficient cargo organization within vehicle cargo areas which are often large, bulky and awkward areas to use. The present invention allows a user to create a custom space for any object and secure cargo in position. The detachable panel sections provide additional enclosed and secure storage options. The devices do not take up a large amount of space in a cargo area when not in use.

The devices of the present invention provide better and more efficient use of an area for secure storage during transportation. The devices may be of varying size and may be used in the cargo area of a domestic vehicle as well as in larger commercial cargo areas. The devices of the present invention may be used in many different types of vehicles including for example boats, caravans, planes etc. From a safety and damage limitation point of view it is important to have in any vehicle an organized cargo area with cargo securely fastened for transit.

The devices 1, 20 and 30 of the present invention are manufactured from injection molded polymer body combined with an over molded or inserted rubber or elastomer part. Device 1 comprises two injection molded polymer bodies fastened or joined together. Device 1 is a strong and robust and intended for harsher usage in commercial or semi commercial vehicles. Devices 20 and 30 are manufactured from a single part injection molded polymer. They are cost effective to produce.

The devices of the present invention are manufactured from materials that are strong yet flexible. The devices may be made from a durable plastics material or a rigid light-weight metal such as die-cast aluminum, aluminum or titanium etc. The devices are manufactured from material which can withstand heavy impact. If a heavy piece of cargo falls on the device it bends and does not break.

The invention is not limited to the embodiment hereinbefore described, with reference to the accompanying drawings, which may be varied in construction and detail.

What is claimed is:

1. A freestanding holder device comprising:
a horizontal base section; and
a wall section extending from one side of the base section;
wherein the wall section comprises at least one vertical indentation forming a recess in the wall section and the underside of the base section comprises a friction enhancing surface;
and wherein the wall section extends initially at an angle of less than 90 degrees from the side of the base section forming a sloped section before extending vertically and substantially perpendicular to the base section.

2. The freestanding holder device of claim 1 wherein the friction enhancing surface comprises a rubber or elastomer material.

3. The freestanding holder device of claim 1 comprising a tapered inline rib extending at a right angle to the wall section at either end of the wall section.

4. The freestanding holder device of claim 3 comprising at least one receiving opening in the tapered inline rib.

5. The freestanding holder device of claim 1 comprising a central vertical indentation in the wall section extending outwardly from the base section and forming a recess on an inner face of the wall section.

6. The freestanding holder device of claim 1 comprising elongated ribs extending vertically along an inner face of the wall section.

7. The freestanding holder device of claim 1 comprising at least two handles or grip holes on an upper end of the wall section.

8. The freestanding holder device of claim 1 comprising at least two elongate receiving openings.

9. Freestanding holder device of claim 1 comprising at least two elongate receiving openings in the wall section and at least two elongate receiving openings in the base section.

10. The freestanding holder device of claim 1 wherein the sloped section comprises vertical indentations extending inwardly on the base section and forming a recess on an outer face of the wall section.

11. The freestanding holder device of claim 1 wherein an upper surface of the base section is inclined downwardly from the wall section and the upper surface comprises a hollow pattern.

12. The freestanding holder device of claim 1 comprising at least one detachable panel section.

13. The freestanding holder device of claim 12 wherein the panel section is telescopic.

14. The freestanding holder device of claim 12 wherein the panel section is detachably connected to an elongate receiving opening in the wall section using self-engaging non-return connectors.

15. The freestanding holder device of 12 comprising two panel sections for connecting one holder device to another holder device to form an enclosed space.

16. The freestanding holder device of claim 15 wherein the panel sections are connected perpendicular to the wall sections of the two holder devices.

17. The freestanding holder device of claim 15 wherein the panel sections are connected diagonally between the wall sections of the two holder devices.

* * * * *